(12) United States Patent  
Salonaho et al.

(10) Patent No.: US 8,170,555 B1  
(45) Date of Patent: May 1, 2012

(54) METHOD OF SELECTING A NEW CELL

(75) Inventors: Oscar Salonaho, Helsinki (FI); Kaisu Ilsakkila, Helsinki (FI); Sari K. Korpela, Kaunlainen (FI); Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 725 days.

(21) Appl. No.: 10/030,798

(22) PCT Filed: Jul. 12, 2000

(86) PCT No.: PCT/EP00/06645  
§ 371 (c)(1),  
(2), (4) Date: May 9, 2002

(87) PCT Pub. No.: WO01/05182  
PCT Pub. Date: Jan. 18, 2001

(30) Foreign Application Priority Data

Jul. 14, 1999 (GB) .................................... 9916565.6

(51) Int. Cl.  
*H04W 36/00* (2009.01)

(52) U.S. Cl. ..................... 455/436; 455/437; 370/331

(58) Field of Classification Search .......... 455/436–444, 455/447; 370/331–332  
See application file for complete search history.

(56) References Cited

U.S. PATENT DOCUMENTS

| | | | | |
|---|---|---|---|---|
| 5,127,100 A | * | 6/1992 | D'Amico et al. ........... 455/422.1 |
| 5,241,686 A | * | 8/1993 | Charbonnier ................ 455/453 |
| 5,509,051 A | * | 4/1996 | Barnett et al. ................ 455/443 |
| 5,640,677 A | * | 6/1997 | Karlsson ....................... 455/434 |
| 5,722,072 A | * | 2/1998 | Crichton et al. ............. 455/437 |
| 6,018,662 A | * | 1/2000 | Periyalwar et al. .......... 455/442 |
| 6,144,861 A | * | 11/2000 | Sundelin et al. ............. 455/522 |
| 6,192,245 B1 | * | 2/2001 | Jones et al. ................... 455/437 |

FOREIGN PATENT DOCUMENTS

WO WO 98/27776 6/1998

* cited by examiner

*Primary Examiner* — Raymond Dean  
(74) *Attorney, Agent, or Firm* — Harrington & Smith

(57) ABSTRACT

A method for selecting a new cell for a station in a cellular telecommunications system, the station being associated with a current cell is provided. The method comprises the steps of measuring at the station the strength of a communication from the current cell, measuring at the station the strength of a communication from at least one other cell, modifying the result of the measuring step in which the strength of the communication from at least one other cell and/or the current cell is measured to take into account a condition of the current and/or said at least one other cell if the measured strength of the communication from the current cell and/or the measured strength of the communication from the at least one other cell satisfy a predetermined condition, if the modifying step is performed, comparing the measured strength of the communication from the current cell and the measured strength of the communication from the at least one other cell at least one of the measured strengths being modified in the modifying step and depending on the results of the comparison changing the current cell with which the station is associated.

43 Claims, 2 Drawing Sheets

METHOD OF SELECTING A NEW CELL

CROSS-REFERENCE TO RELATED APPLICATIONS

This is a U.S. national stage of application No. PCT/EP00/06645, filed on Jul. 12, 2000. Priority is claimed on the following application Country: United Kingdom, Application No.: 9916565.6, Filed: Jul. 14, 1999.

FIELD OF THE INVENTION

The present invention relates to a method for selecting a new cell.

BACKGROUND TO THE INVENTION

In a wireless cellular telecommunications network, the area covered by the network is divided into an plurality of cells. Each cell is provided with a base station which is able to communicate with mobile stations located in the cell associated with the base station. The mobile stations are able to move from cell to cell. When a mobile station moves from one cell to another, this is referred to as handoff. In this document, the term cell will be used to refer to cells and/or cell sectors.

In current systems, the mobile station is arranged to monitor channels from a number of base stations in the cells neighbouring the cell in which the mobile station is currently located. The mobile station measures the received strength of the signals from the surrounding base stations. Based on this information a decision is made as to whether the current cell is to be changed and if so to which cell. However this method has the disadvantage of not receiving any information relating to, for example, traffic conditions in the neighbouring cells. This means that the mobile station's decision will be based solely on the magnitude of the received signals. Accordingly, the mobile station will not always make the appropriate decision.

A common channel of the neighbouring cell could be continuously monitored and decoded by a mobile station in a different cell in order to obtain information on an adjacent cell. However, this is disadvantageous if a mobile station is in an idle state as it will consume power reducing the battery life. This channel could be the broadcast control channel BCCH.

SUMMARY OF THE INVENTION

It is an aim of embodiments of the present invention to address the disadvantage with the prior art.

According to one aspect of the present invention there is provided a method for selecting a new cell for a station in a cellular telecommunications system, said station being associated with a current cell, said method comprising the steps of measuring at the station the strength of a communication from said current cell; measuring at the station the strength of a communication from at least one other cell; modifying the result of the measuring step in which the strength of the communication from at least one other cell and/or the current cell is measured to take into account a condition of said current and/or said at least one other cell if the measured strength of the communication from the current cell and/or the measured strength of the communication from the at least one other cell satisfy a predetermined condition; if the modifying step is performed, comparing the measured strength of said communication from the current cell and the measured strength of the communication from the at least one other cell, at least one of the measured strengths being modified in the modifying step; and depending of the results of the comparison, changing the current cell with which the station is associated.

According to a second aspect of the present invention there is provided a station for use in a cellular telecommunications system, said station being associated with a current cell, said station comprising means for measuring the received strength of a communication from said current cell; means for measuring the received strength of a communication from at least one other cell; means for modifying the measured received strength of the communication from the at least one other cell to take into account a condition of said current and/or said at least one other cell if the measured strength of the communication from the current cell and/or the measured strength of the communication from the at least one other cell satisfy a predetermined condition; means for comparing if the modification means modifies the measured received strength of the communication from the at least one other cell, the modified result with the measured received strength of a communication from the current cell; and means for causing, depending of the results of the comparison performed by the comparing means, the current cell with which the station is associated to be changed.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE PRESENT INVENTION

Figure 1:
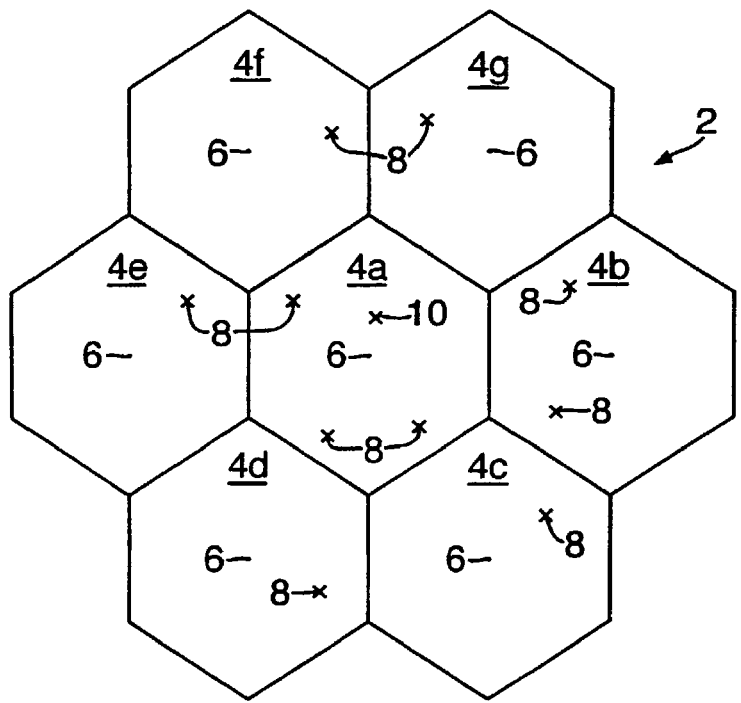
FIG. 1 shows a schematic view of a cellular telecommunications network in which embodiments of the present invention can be implemented.

Reference will now be made to FIG. 1 which shows a wireless cellular telecommunication network. The area 2 covered by the network is divided up into cells 4a-g. Each cell 4 has a base station 6 associated therewith which transmits signals to and receives signals from mobile stations 8 which are located in the cell 4 associated with the respective base station 6.

The network shown in FIG. 1 is a code division multiple access system. This means that the same frequency can be used in adjacent cells. The channels between the mobile station and the base stations are distinguished by their spreading codes with different channels using different spreading codes. In the embodiment described hereinafter, it is assumed that the frequency used in the cells is the same.

Consider cell 4a of FIG. 1. This cell is surrounded by six neighbouring cells. A mobile station 10 is in the cell 4a which will be referred to as the current cell of that mobile station. The mobile station will receive on various channels from the base station and likewise will send on various channels to the base station. The number and type of channels will depend on the mode of the mobile station. For example if the mobile station is in an idle mode where the mobile station is turned on but which is not engaged in a call, the number of channels will be relatively small.

Embodiments of the present invention can be used when a mobile station is an idle mode or in a radio resource control (RRC) mode where the mobile station is in communication with the base station using common channels. Common channels are ones which are used by more than one mobile station to transmit to the base station or which are used by the base station to transmit to more than one mobile station. Embodiments of the present invention can also be used if one or more dedicated channels have been established.

The mobile station will monitor the broadcast control channel (BCCH) transmitted by the base station of the current cell. In addition to using the information contained in the channel, the mobile station will also measure the strength with which that channel is received by the mobile station. The information contained in the BCCH channel contains information which is required by the mobile station in order to establish a connection with the base station. This information may include random access parameters, system information, frame numbers and the like. The BCCH channel may act as a pilot channel.

In embodiments of the present invention, the BCCH will include information defining a decoding range threshold. The function of the decoding range threshold will be described in more detail hereinafter.

The mobile station 10 is also arranged to measure the received strength of the BCCH channels transmitted by one or more of the neighbouring cells. These measurements may be made continuously or may only be made when it is determined that the received signal strength of the BCCH channel from the base station of the current cell is below a signal strength threshold. Information on this threshold may be transmitted to the mobile station from the base station of the current cell on the BCCH channel or any other suitable channel. Alternatively, this threshold may be determined by the mobile station based on the history of received signal strengths. This threshold may be defined as a percentage of a measured maximum value or may be an absolute value. This threshold is optional and can be omitted.

Figure 2:
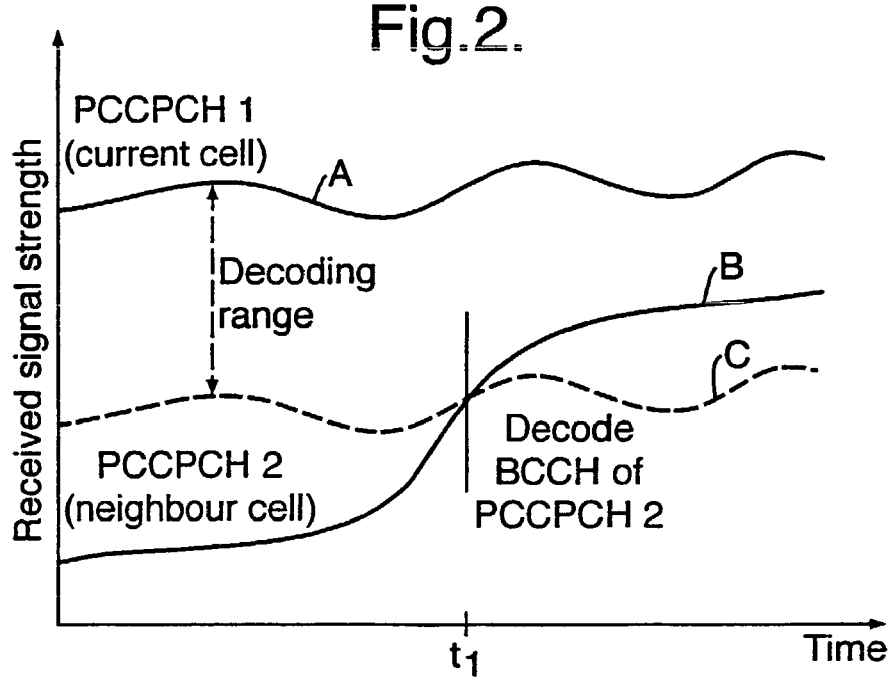
FIG. 2 shows a graph of signal strength against time for the physical channels received by a mobile station.

The mobile station uses a decoding range threshold to determine which of the received BCCH signals from neighbouring base stations are to be decoded. This is illustrated in FIG. 2. Line A shows the strength with which the BCCH channel is received by the mobile station from the base station of the current cell against time. Line B shows the strength with which the BCCH channel transmitted by a neighbouring base station is received against time. Line C shows the decoding threshold. As can be seen this threshold is defined as being a fixed number of decibels below the strength of the signal received from the base station of the current cell. The threshold thus varies over time in the same manner as the received strength of the signal from the base station of the current cell. When the received strength of the signal received from one or more base stations in neighbouring cells exceeds the threshold, the information contained in the BCCH channel transmitted by the neighbouring cell is decoded. In the example shown in FIG. 2, after time t1, the received strength of the signal from the neighbouring cell is above the threshold and is thus decoded.

In an alternative embodiment of the present invention, the decoding relative threshold may be replaced by an absolute threshold. In a further modification to embodiments of the invention, the decoding relative threshold is not provided and all of the BCCH channel signals received from neighbouring cells are decoded.

The BCCH channel received from the neighbouring cell is decoded in order to obtain offset information. This offset information can take the form of an absolute value, a percentage value or any other form. This value may reflect the traffic conditions in the neighbouring cells. For example, if there is a large amount of traffic in the neighbouring cell, then the offset value will reflect this. The offset value may additionally or alternatively indicate if the user of the mobile station is permitted to operate in the neighbouring cell. In this latter case, the offset value may be a weighting value. The offset value may also be indicative of the strength at which the BCCH channel is transmitted by the base station in the neighbouring cell. For example, if the BCCH is transmitted with a relatively low power, then the offset value may be relatively large. On the other hand, if the signal is transmitted with a relatively high power, then the offset value may be relatively small or even negative.

The offset value can be positive, negative or zero.

The offset value is added to the received strength of the signal in the neighbouring cell. This offset value is relatively static and changes only slowly with time in preferred embodiments of the present invention. In alternative embodiments of the present invention the offset value may change relatively frequently depending on what is represented by that offset value.

In general terms, the offset value is representative of the ability of the neighbouring cell to accept the mobile station. This may reflect the traffic conditions in the neighbouring cell which may or may not take into account the traffic conditions in the current cell. Alternatively or additionally the offset value may reflect whether or not the mobile station is permitted to enter the cell or may be such as to discourage/encourage the mobile station to use the neighbouring cell.

The offset value may be alternatively or additionally be a value which is subtracted from, multiplied with or divided into the received signal strength of the signal from the neighbouring cell. In an alternative embodiment of the invention, the offset value may be replaced by an offset function which modifies the received signal strength value in accordance with that function.

In preferred embodiments of the present invention, the offset value and the decoding range are of similar or the same magnitude.

Figure 3:
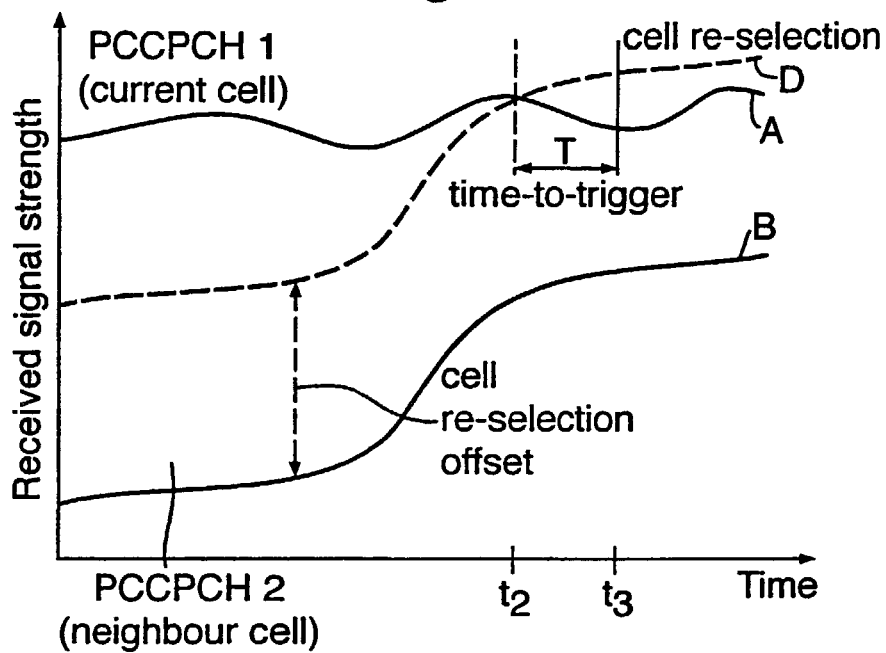
FIG. 3 shows a graph of signal strength against time for the physical channels received by a mobile station, where the signal received from a neighbouring base station has been compensated.

Reference is made to FIG. 3 which shows a curve B of FIG. 2. Curve D represents the strength of the received signal from the neighbouring cell to which the offset value has been added. The graph also shows curve A of FIG. 2 which represents the strength of the received signal from the base station of the current cell. When the compensated value of the strength of the received signal exceeds that of the of the received strength of the signal from the current cell, the mobile station is allocated to the neighbouring cell and that neighbouring cell then becomes the current cell.

It should be appreciated that the received signal strength for the current cell can also be modified by an offset value. This offset value is obtained from the BCCH channel transmitted by the base station of the current cell. This may be as an alternative to the modification of the received strength of the signal from the base station in the neighbouring cell. However in preferred embodiments of the present invention both the received strength of the signal from the neighbouring cell as well as the received strength of the signal from the current cell are modified by respective offset values.

In a preferred embodiment of the invention, a timer is used. This timer is arranged to ensure that the current cell is only changed when necessary. In particular the changing of the current cell only takes place if the modified received strengths of the signals from the neighbouring cells exceeds the received strengths of the signals from the current cell (which may or may not be modified by the offset value) for a predetermined time. As can be seen from FIG. 3, the modified received strength of the signal from the neighbouring base station exceeds the received strength of the signal from the current base station at time t2. However, the current cell is not changed until time t3 which is after time t2. From time t2 to time t3 (time T), the modified received signal strength of the neighbouring cell exceeds the received signal strength of the current cell. If this occurs, then the neighbouring cell becomes the current cell.

If the modified received signal strength of neighbouring cell does not exceed the received signal strength of the current cell for a time T, then the current cell is not changed.

The time T may be a fixed time or may vary. If T varies, this could take into account the environment and/or the traffic. Information as to the value of T may be included in the BCCH channel of the current base station and/or the neighbouring base station.

Where embodiment of the invention are utilised in a system where the frequency used in the neighbouring cell is the same as in the current cell, the time T should be relatively short in order to minimise interference effects.

It should be appreciated that embodiments of the present invention can be used in soft handoff situations. Handoff is where a mobile station moves from one cell into another and therefore changes the base station with which it is in communication. Soft handoff occurs usually, but not necessarily, where a mobile station is in the border region of two or more cells. In soft handoff, the mobile station will be in active communication with two or more base stations at the same time and will combine the information received from the different base stations. The mobile station receives the same information from more than one base station.

Embodiments of the invention can be used to make decisions as to when to go into soft handoff and when to just communicate with a single base station. For example when the strength of the signal received from the neighbouring base station exceeds that of the current base station, then the mobile station could go into soft handoff where it communicates actively with the base stations of the current and the neighbouring cells. The mobile station may just communicate with the base station of the neighbouring cell when the difference between the received signal strengths exceeds a threshold. Alternatively the offset value(s) used to compensate the received signal strengths of the neighbouring and/or current cells is altered so that the compensated received strength of the signal from the neighbouring cell is less than the received strength of the signal from the current cell. The next time that the compensated strength of the signal received from the neighbouring cells is greater than that for the current cell, the mobile station only actively communicates with the base station of the neighbouring cell which then becomes the current cell.

An offset timer may be used in the above described embodiments. This timer indicates to the mobile station how often the mobile station should update its offset value. The mobile station will not decode again the BCCH channel from the base station of the neighbouring cell until the time defined by the timer has expired. This is regardless of whether or not the signal received from the neighbouring cell is above the threshold discussed in relation to FIG. 2. When the timer has expired, the next time that the strength of the signal received from the neighbouring cells exceeds the threshold, the BCCH channel of the neighbouring base station is decoded to obtain the offset value.

The timer may be predefined or may vary with time. In the latter case, the timer may take into account the current traffic conditions and/or the radio environment. The value of the timer may be included in the BCCH channel of the current base station or the neighbouring base station.

It is preferred that the timer be relatively long so as not to decrease the standby time when the mobile station is not in use.

Figure 4:
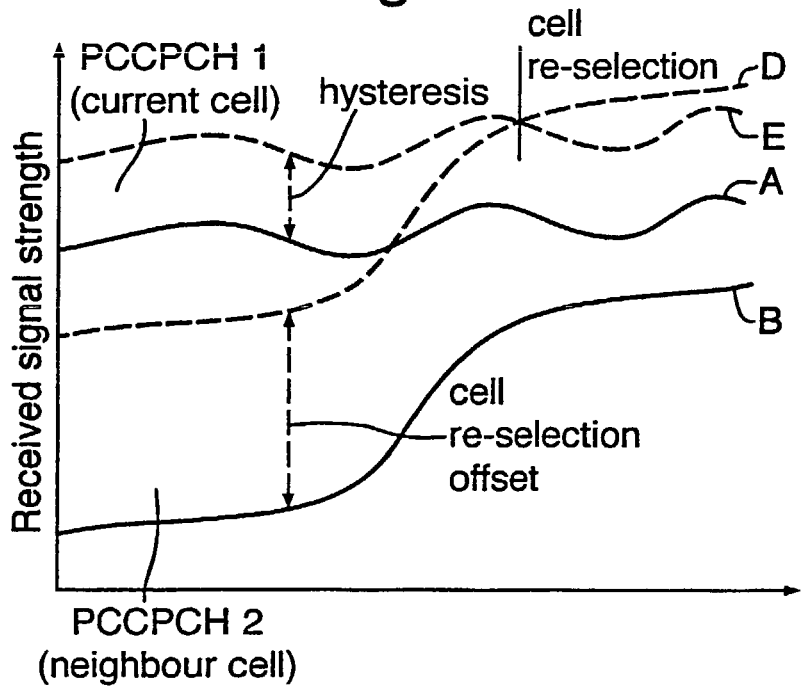
FIG. 4 shows a graph of signal strength against time for the physical channels where a compensation value and hysteresis have been applied.

A further modification to the system and method described herein before will now be described with reference to FIG. 4 which illustrates the use of hysteresis. FIG. 4 shows curves A, B and D of FIG. 3. These curves are the same as described hereinbefore and accordingly will not be described in any more detail hereinafter. Hysteresis is used to avoid excessive changes in the current cell identity. The hysteresis value may be broadcast on the BCCH channel of the current cell or that of the neighbouring cell. Alternatively the hysteresis value may be prestored in the mobile station.

The mobile station adds the hysteresis value to the received signal strength values for the current cell. This hysteresis value may be in addition or instead of an offset value which is added to the results of the received signal strength measurement for the current cell. This is represented by curve E of FIG. 4. This summed value is compared to the offset adjusted received signal strength for the neighbouring cell. If the latter value exceeds the former then the mobile station will change its current cell to the neighbouring cell. The hysteresis value may be relatively small in order to minimise interference effects.

The hysteresis value may only be added to the value of the measured signal strength for the current cell. If the current cell is no longer the current cell, then the hysteresis value will no longer be added to the measured signal strength of the old current cell. Instead the same or a different hysteresis value will be added to the measured signal strength for the new current cell.

The hysteresis value is provided in order to prevent ping-pong selections of the new and old current cells.

In embodiments of the invention described hereinbefore, the mobile station monitored the BCCH channel. It should be appreciated that in alternative embodiments of the present invention, the mobile station can monitor any other suitable channel or channels. The monitored channels in the current and neighbouring cells may be the same or different. Required information may be obtained from different channels of the same base station. Embodiments of the invention have been described in the context of the cell reselection where the mobile station is an idle or the like mode where the mobile station is in communication only via one or more common channels with the base station. However embodiments of the present invention are also applicable to handover situations. This is where the mobile station has one or more dedicated channels established with the base station of the current cell and the base station of a neighbouring cell becomes the one which is in active communication with the mobile station.

It should be appreciated, that it is possible to transmit one or more of the values described hereinbefore to the mobile station using a dedicated channel, particularly but not necessarily if that channel has already been established.

In a system embodying the present invention, only some of the mobile stations may be able to implement the present invention. Accordingly, the network may require signalling to determine if a given mobile station is capable of implementing the embodiments of the invention. Those mobile stations which are capable of implementing embodiments of the invention will do so. However, those mobile stations which are not able to do so will use an alternative method. This may means that measurements made by the mobile station are used by a base station or other network element to make the required decisions. Alternatively, the mobile station may use a different strategy to identify new current cells.

Embodiments of the present invention have been described in the context of a system where the same frequency is used in adjacent cells. Embodiments of the present invention can be used in systems where a number of frequencies are used in each cell, with at least some of the same frequencies being used in adjacent cells. In this case, the mobile station may monitor the same frequency in the adjacent cell to that which is currently being used by the mobile station. Alternatively, the mobile station may monitor a different frequency to that of the current cell.

Embodiments of the present invention can also be used where the frequency used in adjacent cells is always different from that used in the cell where the mobile station is currently located.

In embodiments of the present invention, the same frequency can be used by the mobile station and the base station transmissions. Alternatively different frequencies can be used by the mobile station and base station transmissions. The frequency used can have a wide range or a narrow range.

Embodiments of the invention can be used where there is more than one neighbour cell and there is therefore more than one communication from the neighbouring cells which is measured and to which offset values are applied.

The mobile station may be mobile telephone, a portable computer or any other suitable device. Embodiments of the invention may be used with fixed terminals if for example the borders of a cell change depending on the amount of traffic in the cells.

Whilst embodiments of the present invention have been described in the context of a CDMA system, it should be appreciated that embodiments of the present invention can also be used with any other suitable system such a other types of spread spectrum system, time division multiple access systems, frequency division multiple access systems and hybrids of any one or more of these systems.

The invention claimed is:

1. A method comprising:
   measuring at a station a strength of a communication from a current cell;
   measuring at the station the strength of a communication from at least one other cell;
   modifying a result of measuring in which the strength of the communication from the at least one other cell and/or the current cell is measured to take into account a condition of said current and/or said at least one other cell if the measured strength of the communication from the at least one other cell satisfies a predetermined condition;
   if modifying is performed, comparing the measured strength of the communication from the current cell and the measured strength of the communication from the at least one other cell being modified in the modifying; and
   depending on results from the comparison, changing the current cell with which the station is associated, wherein said predetermined condition is that the strength of the communication from at least one other cell is greater than a threshold.

2. A method as claimed in claim 1, wherein in said modifying, a value is added to the measured strength of the communication from the at least one other cell.

3. A method as claimed in claim 1, wherein in said modifying, a function is applied to the measured strength of the communication from the at least one other cell.

4. A method as claimed in claimed in claim 1, wherein the threshold is defined relative to the measured strength of the communication from the current cell.

5. A method as claimed in claim 1, wherein information defining the threshold is included in the communication from the current cell.

6. A method as claimed in claim 1, wherein modifying information as to how the measured strength of a communication from a neighbouring cell is to be modified is in the communication from the at least one other cell.

7. A method as claimed in claim 6, wherein the station is provided with timing information defining when the station should next check for modifying information.

8. A method as claimed in claim 7, wherein the timing information is in the communication from the neighbouring cell.

9. A method as claimed in claim 1, wherein a value is added to the measured strength of the communication from the current cell prior to said comparing.

10. A method as claimed in claim 9, wherein if the current cell is changed in said changing from an old current cell to a new current cell, the value is no longer added to the measured strength of the communication from the old current cell and a value is added to the measured strength of the communication from the new current cell.

11. A method as claimed in claim 1, wherein said communication from at least one of the current cell and the at least one other cell comprises the broadcast control channel.

12. A method as claimed in claim 1, wherein the station has at least one common channel in the current cell.

13. A method as claimed in claim 1, wherein the station has at least one dedicated channel in the current cell.

14. A method as claimed in claim 1, wherein the station is arranged to use the same frequency in the current cell and the at least one other cell.

15. A method as claimed in claim 1, wherein the station is a mobile terminal.

16. A method as claimed in claim 1, wherein the method is implemented in a code division multiple access system.

17. A method as claimed in claim 1, wherein the method is implemented in a time division multiple access system.

18. A method as claimed in claim 16, wherein the method is implemented in a code division/time division multiple access hybrid.

19. A station comprising:
   a measurer for measuring a received strength of a communication from a current cell;
   a measurer for measuring the received strength of a communication from at least one other cell;
   a controller for modifying the measured received strength of the communication from the at least one other cell to take into account a condition of said current and/or said at least one other cell if the measured strength of the communication from the at least one other cell satisfies a predetermined condition;
   the controller for comparing, if the controller has modified the measured received strength, the modified measured received strength with the measured received strength of a communication from the current cell; and
   the controller for causing, depending on results of the comparison, the current cell with which the station is associated to be changed, wherein said predetermined condition is that the strength of the communication from at least one other cell is greater than a threshold.

20. A cellular telecommunications network comprising:
   at least one station as claimed in claim 19, and at least one other station, said at least one other station requiring a different procedure in order to determine if a new current cell is required.

21. A network as claimed in claim 20, wherein the signalling sent by said network to said at least one station and to said at least one other station is dependent on the procedure required by the respective stations to determine if a new current cell is required.

22. A method comprising:
measuring at a station a strength of a communication from an at least one current cell;
measuring at the station the strength of a communication from at least one other cell;
modifying the measured received strength of the communication from the current cell and/or from at least one other cell to take into account a condition of said current and/or said at least one other cell if the measured strength of the communication from the at least one other cell satisfies a predetermined condition;
comparing, if a controller has modified the measured received strength, the measured strength of the communication from the at least one current cell and the measured strength of a communication from the at least one other cell, at least one of the measured strengths being modified in the modifying; and
depending on results of the comparison, changing the at least one current cell with which the station is associated, wherein said predetermined condition is that the strength of the communication from at least one other cell is greater than a threshold.

23. A method as claimed in claim 3, wherein the predetermined condition is that the measured strength of the communication from the at least one other cell is greater than a threshold.

24. A method as claimed in claim 5, wherein information defining the threshold is included in the communication from the current cell.

25. A method as claimed in claim 2, wherein modifying information as to how the measured strength of a communication from a neighbouring cell is to be modified is in the communication from the at least one other cell.

26. A method as claimed in claim 3, wherein modifying information as to how the measured strength of a communication from a neighbouring cell is to be modified is in the communication from the at least one other cell.

27. A method as claimed in claim 4, wherein modifying information as to how the measured strength of a communication from a neighbouring cell is to be modified is in the communication from the at least one other cell.

28. A method as claimed in claim 5, wherein modifying information as to how the measured strength of a communication from a neighbouring cell is to be modified is in the communication from the at least one other cell.

29. A method as claimed in claim 1, wherein the decoding a communication is dependent upon the measured strength of the communication satisfying a predetermined condition.

30. A method as claimed in claim 29, wherein the communication from the at least one of the current cell and the at least one other cell comprises the broadcast control channel.

31. A method as claimed in claim 29, wherein the station has at least one common channel in the current cell.

32. A method as claimed in claim 29, wherein the station has at least one dedicated channel in the current cell.

33. A method as claimed in claim 29, wherein the station is arranged to use the same frequency in the current cell and the at least one other cell.

34. A method as claimed in claim 29, wherein the station is a mobile terminal.

35. A method as claimed in claim 29, wherein the method is implemented in a code division multiple access system.

36. A method as claimed in claim 29, wherein the method is implemented in a time division multiple access system.

37. A cellular telecommunications system comprising:
a measurer for measuring a received strength of a communication from a current cell;
a measurer for measuring the received strength of a communication from at least one other cell;
a controller for modifying the measured received strength of the communication from the at least one other cell to take into account a condition of said current and/or said at least one other cell if the measured strength of the communication from the at least one other cell satisfies a predetermined condition;
the controller for comparing, if the controller has modified the measured received strength, the modified measured received strength with the measured received strength of a communication from the current cell;
the controller for causing, depending on results of the comparison, the current cell with which a station is associated to be changed, wherein said predetermined condition is that the strength of the communication from at least one other cell is greater than a threshold; and
a network element for sending communications to the station, said network element being arranged to send offset information to the station, the offset information being used by the station to modify measurements of the strength of communications from at least one other cell.

38. A method as claimed in claim 29, wherein the current cell value is added to the measured strength of the communication from the current cell prior to the comparing.

39. A method as claimed in claim 1, wherein said measuring at the station the strength of a communication from the current cell and measuring at the station the strength of a communication from at least one other cell are performed simultaneously.

40. A method as claimed in claim 22, wherein said measuring at the station the strength of a communication from the current cell and measuring at the station the strength of a communication from at least one other cell are performed simultaneously.

41. A method comprising:
measuring at a station a strength of a communication from a current cell;
measuring at the station the strength of a communication from at least one other cell;
modifying a result of measuring in which the strength of the communication from at least one other cell and/or the current cell is measured to take into account a condition of said current and/or said at least one other cell if the measured strength of the communication from the at least one other cell satisfies a predetermined condition;
if modifying is performed, comparing the measured strength of the communication from the current cell and the measured strength of the communication from the at least one other cell being modified in the modifying; and
depending of results of said comparing, changing the current cell with which the station is associated, wherein said predetermined condition is that the strength of the communication from at least one other cell is greater than a threshold.

42. A station comprising:
a measurer for measuring a received strength of a communication from a current cell;
a measurer for measuring the received strength of a communication from at least one other cell;

a controller for modifying the measured received strength of the communication from the at least one other cell to take into account a condition of said current and/or said at least one other cell if the measured strength of the communication from the at least one other cell satisfies a predetermined condition;

the controller for comparing, if the controller has modified the measured received strength, the modified measured received strength with the measured received strength of a communication from the current cell; and the controller for causing, depending of the results of the comparison, the current cell with which the station is associated to be changed, wherein said predetermined condition is that the strength of the communication from at least one other cell is greater than a threshold.

43. A method comprising:

measuring at a station a strength of a communication from a current cell;

measuring at the station the strength of a communication from at least one other cell;

modifying a result of measuring in which the strength of the communication from at least one other cell and/or the current cell is measured to take into account a condition of said current and/or said at least one other cell if the measured strength of the communication from the at least one other cell satisfies a predetermined condition;

if modifying is performed, comparing the measured strength of the communication from the current cell and the measured strength of the communication from the at least one other cell being modified in the modifying; and depending of the results of said comparing, changing the current cell with which the station is associated, wherein said predetermined condition is that the strength of the communication from at least one other cell is greater than a threshold.

\* \* \* \* \*